US005499571A

United States Patent [19]

Dreiman

[11] Patent Number: 5,499,571

[45] Date of Patent: Mar. 19, 1996

[54] WRIST PIN - PISTON ASSEMBLY

[75] Inventor: Nelik I. Dreiman, Tipton, Mich.

[73] Assignee: Tecumseh Products Company, Tecumseh, Mich.

[21] Appl. No.: 297,586

[22] Filed: Aug. 29, 1994

[51] Int. Cl.[6] .......... F16J 1/14

[52] U.S. Cl. .......... 92/187; 92/128; 74/579 E

[58] Field of Search .......... 92/128, 187, 189, 92/190, 191, 216, 221; 74/579 E

[56] References Cited

U.S. PATENT DOCUMENTS

| | | | |
|---|---|---|---|
| 1,218,986 | 3/1917 | Dodge | 92/186 |
| 1,285,755 | 11/1918 | McCuen . | |
| 1,408,475 | 3/1922 | Schaap . | |
| 1,415,422 | 5/1922 | Allen . | |
| 1,435,528 | 11/1922 | Keilholtz | 92/187 |
| 1,544,475 | 7/1925 | Wendell . | |
| 1,548,329 | 8/1925 | Nelson . | |
| 1,554,157 | 9/1925 | Deans | 92/190 |
| 1,578,315 | 3/1926 | Heslewood | 92/189 |
| 1,709,316 | 4/1929 | Lord | 92/187 |
| 1,758,515 | 5/1930 | Heiermann . | |
| 1,803,362 | 5/1931 | Steele . | |
| 1,810,423 | 6/1931 | Hatch . | |
| 1,838,216 | 12/1931 | Dickey . | |
| 2,322,138 | 6/1943 | Jenny . | |
| 4,095,513 | 6/1978 | Block . | |
| 4,964,332 | 10/1990 | Sawyer . | |

FOREIGN PATENT DOCUMENTS

| | | | |
|---|---|---|---|
| 663296 | 4/1929 | France | 92/187 |
| 258396 | 5/1949 | France . | |
| 710596 | 9/1941 | Germany . | |
| 2043226 | 3/1972 | Germany | 92/187 |
| 684298 | 12/1952 | United Kingdom | 92/187 |

*Primary Examiner*—Thomas E. Denion
*Attorney, Agent, or Firm*—Baker & Daniels

[57] ABSTRACT

A compressor containing a reciprocating piston connected to a connecting rod by a wrist pin. The wrist pin is floatingly disposed within the wrist pin bore in the piston by two transverse pin members disposed within bores in the piston which locate the wrist pin therebetween. Incidental cylinder bore contact by the wrist pin is prevented by the pin members.

13 Claims, 4 Drawing Sheets

WRIST PIN - PISTON ASSEMBLY

BACKGROUND OF THE INVENTION

The invention relates to compressors or pumps, and in particular to hermetic reciprocating piston compressors having a wrist pin assembly in the piston.

A reciprocating compressor typically includes one or more cylinders each adapted to receive a piston for reciprocable compression action. As is commonly known, the piston includes a piston head sealed about the inner annular surface of the cylinder with a connecting rod driving the piston head to provide the necessary reciprocating action. The connecting rod comprises a first and second aperture, the first aperture being connected to the crankshaft and the second aperture being connected through a wrist pin to the piston.

Most piston wrist pins are usually of the full floating type in that the wrist pin is free to rotate both within the connecting rod aperture and the piston bushing. Load applied to the wrist pin during compressor operation is developed from two sources, the forces of inertia from the reciprocating piston or connecting rod and the forces resulting from compression of gas in the cylinder. Wrist pins are generally made of case hardened, high carbon steel to withstand high loads and are accurately ground to needed sizes and tolerances.

Various attempts have been made by the prior art to maintain the wrist pin in a substantially center position within the piston to prevent the wrist pin ends from rubbing against the cylinder wall during piston reciprocation. A typical wrist pin assembly includes circumferential grooves machined in the ends of the piston bore to accommodate wire formed or stamped snap rings known as wrist pin retainers. As disclosed in U.S. Pat. No. 5,111,737, at times a sub-assembly of the wrist pin is necessary before inserting the wrist pin into the piston bore. This patent includes an annular groove machined into the bore into which the retainer is inserted. After assembly, the retainer coacts with the annular groove to secure the wrist pin within the bore. A major problem includes pin bore groove pound out, which is especially common with pistons made from aluminum, hypoeutectic or eutectic alloys Commonly called "pound out" the problem is initiated by an applied reversing load and high frictional wear between the wrist pin and piston.

Another disadvantage of the grooved wrist pin bore and piston are difficulties in machining circular grooves in pistons made from powered metal or aluminum hypoeutectic alloys. Inadequate quality of surface finish and high wear rates of tools are some of the reasons preventing usage of standard tools for machining such materials.

Another known way of maintaining the wrist pin in the proper location is by the use of small disks or buttons stamped from sheet teflon for use as retainers. The buttons are slightly circumferentially compressed and inserted in the bore on either side of the wrist pin. The disadvantage with this design is that under the effects of gravity and applied forces, the wrist pin and buttons sometimes move downward. This causes the teflon retainer button, at its lowest position, to be in continuous contact with the cylinder wall during reciprocating movement of the piston. Such sliding contact between the cylinder wall and button surface will increase energy loses due to the additional friction. The friction of the sliding teflon button, which is approximately 0,020–0.040 inches thick, against the cylinder wall, will additionally gradually wear out the button. The wrist pin then will finally be in rubbing contact with the cylinder wall while teflon particles will penetrate the oil in the bearing surfaces and valve system of the compressor.

The present invention is directed to overcoming the aforementioned problems associated with prior wrist pin assemblies.

SUMMARY OF THE INVENTION

The present invention overcomes the problems and disadvantages of the prior art by providing a wrist pin retaining mechanism to maintain the wrist pin in a substantially center position within the piston thereby preventing the wrist pin ends from sliding against the cylinder wall during reciprocation of the piston.

Generally, the invention provides a piston disposed within a cylinder bore in a cylinder block. A connecting rod connects to the piston via a wrist pin located within a wrist pin bore of the piston. Slotted, tubular, or spiral wrapped pins are pressed into holes drilled parallel to the piston axis across the pin bore in such a way that the wrist pin floats free within the piston bore limited or bounded by the retaining pins on each axial end.

More specifically, the invention provides for slotted, tubular, or spiral pins to maintain the location of the wrist pin. Such retaining pins have chamfered ends and are made to controlled diameters greater than the holes into which they are pressed.

An advantage of the wrist pin assembly of the present invention is that the wrist pin is prevented from sliding against the cylinder bore thereby reducing wear on the cylinder pin and frictional losses during compressor operation.

Another advantage of the wrist pin retaining system is that the system improves the lubrication of the wrist pin due to the fact that the wrist pin ends are open to piston lubrication and further are only in line contact with the retaining pin.

Another advantage of the wrist pin retaining system of the present invention is that it simplifies and reduces the cost of the wrist pin assembly in the piston.

The invention, in one form thereof, provides a compressor having a cylinder block with a cylinder bore. A piston is reciprocatingly disposed within the cylinder bore, the piston having a wrist pin bore extending transversely therethrough. The wrist pin assembly includes pin members disposed transversely through the wrist pin bore. The wrist pin connects the piston to a connecting rod with the wrist pin floatingly disposed within the wrist pin bore between the pin members, preventing the wrist pin from sliding against the cylinder bore during piston reciprocation.

The invention, in another form thereof, provides a cylinder block with a cylindrical bore. A piston is reciprocably disposed within the cylinder bore, the piston have a wrist pin bore extending transversely therethrough. A wrist pin is floatingly disposed within the wrist pin bore with two pin members disposed through the wrist pin bore bounding the wrist pin. The piston includes two bores parallel to the piston axis and through the wrist pin bore. A pin member is disposed in each of the parallel bores while the wrist pin is retained between the pin members thereby preventing it from sliding against the cylinder bore during piston reciprocation.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
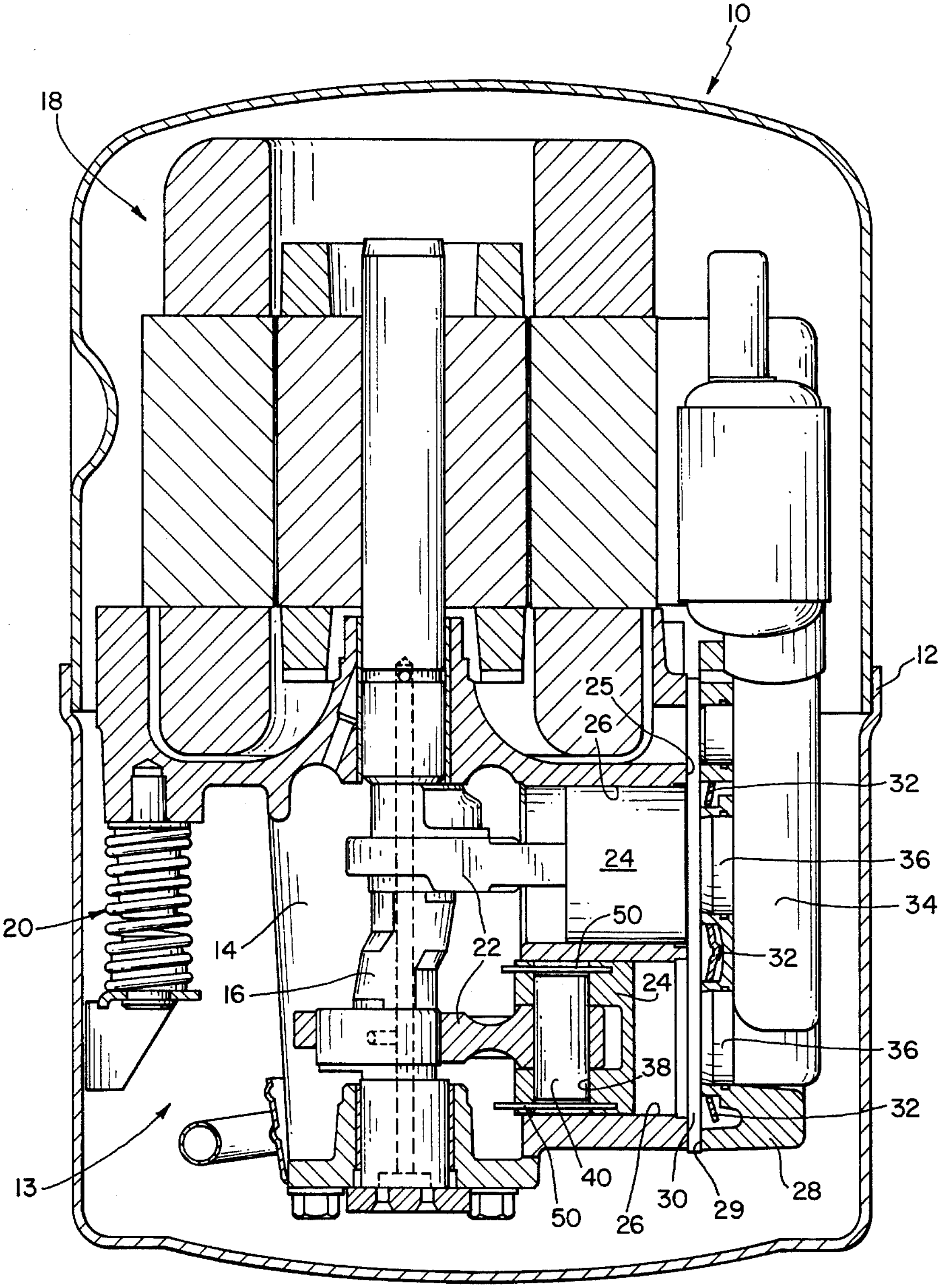
FIG. 1 is a longitudinal sectional view of a compressor of the type to which the present invention pertains.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to the drawings, and in particular to FIG. 1, there is shown a hermetically sealed, twin cylinder reciprocating piston compressor 10 of the type to which the present invention is applicable. Compressor 10 includes a sealed compressor housing 12 encapsulating the motor compressor unit 13. Disposed within housing 12 is a crankcase 14 supporting a crankshaft 16 which is driven by motor 18. Shock and vibration absorbing mounts 20 are attached to crankcase 14 and housing 12 to suspend the compressor components within housing 12.

By way of illustration, and without limitation, orientation of compressor 10 in the illustrated preferred embodiment is with crankcase 14 suspended vertically below motor 18. Crankshaft 16 within crankcase 14 drives connecting rods 22, which are in turn connected to pistons 24 within cylinder bores 26. Cylinder bores 26 extend through a front surface 25 of crankcase 14.

A cylinder head 28 having a bottom surface 29 is assembled onto front surface 25 of crankcase 14 by means of bolts (not shown). A valve plate 30, to which suction and discharge valves (not shown) are mounted, is interposed between cylinder head 28 and crankcase 14. FIG. 1 shows a discharge valve retainer 32 as is well known in the prior art.

Cylinder head 28 includes a discharge chamber 34 and suction chamber 36. During operation of compressor 10, the reciprocating action of pistons 24, together with discharge valves and suction valves mounted on valve plate 30, produce regions of discharge pressure and suction pressure in chambers 34 and 36, respectively.

Figure 2:
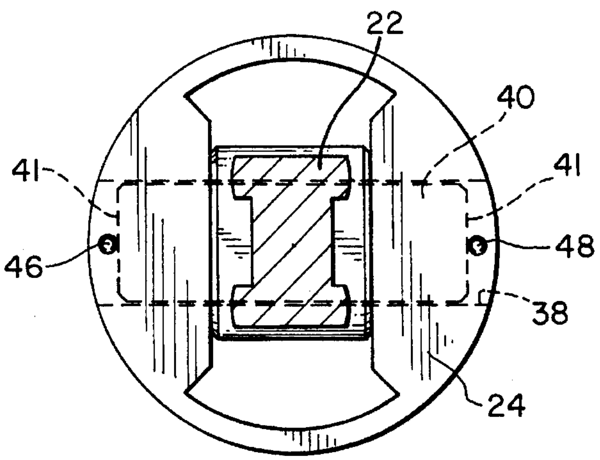
FIG. 2 is an sectional view of a piston including one form of the present invention.
Figure 3:
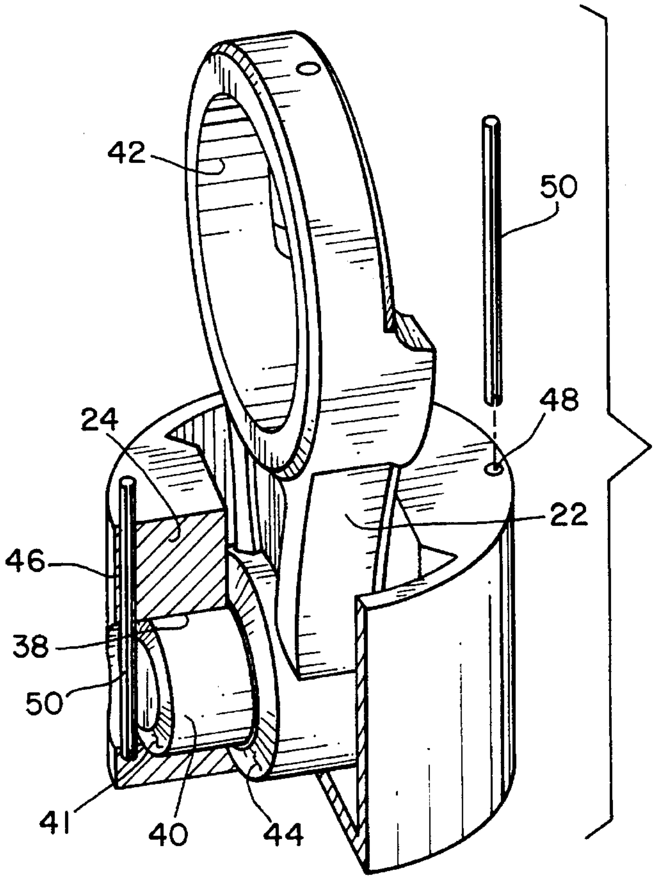
FIG. 3 is a fragmentary perspective view of one form of the present invention.
Figure 4:
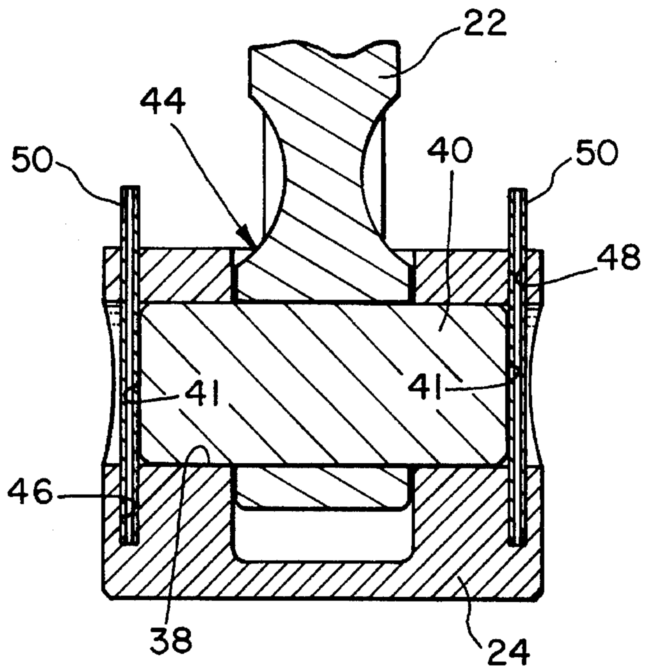
FIG. 4 is a longitudinal sectional view of a piston of the type to which the present invention pertains.

The present invention comprises an improved wrist pin retaining assembly as shown in FIGS. 2–4. As shown in the sectional views of FIGS. 2 and 4, piston 24 includes a wrist pin bore 38 extending therethrough transversely to the axis of piston 24. A tubular wrist pin 40, having annular end faces 41, is floatingly disposed within wrist pin bore 38 to connect together piston 24 with connecting rod 22. As seen in FIG. 3, connecting rod 22 includes a first aperture 42 for use in connecting with crankshaft 16 and a second aperture 44 through which wrist pin 40 is disposed.

To prevent movement of wrist pin 40 within wrist pin bore 38 and contact with cylinder bore 26, two bores 46 and 48 are formed transversely through piston 24 parallel to the axis of the piston. A pin member 50 is disposed within each bore 46 and 48 on opposite sides of wrist pin 40 to prevent the wrist pin from sliding against cylinder bore 26 during piston reciprocation. Each pin member 50 may comprise a slotted tubular or spiral wrap pin as is known in the art. Each retaining pin 50 includes a chamfered end and is made to a control diameter greater than bores 46 or 48 into which they are pressed. Standard materials for pins such as heat treated 1070 or 1095 carbon steels are the preferred pin material although other materials may equivalently be utilized. A recommended diameter of pin bores 46 and 48 is approximately between 3/32" to 7/64". As is shown in FIGS. 1 and 3, each of the pins 50 must protrude past wrist pin bore 38 to achieve a maximum desired locking effect within piston 24.

Spiral wrap type pins, as known in the art, have an advantage over the slotted tubular pins in automated assembly procedures because they can interlock with the piston during feeding or insertion operation. Additionally, spiral wrap type pins may resist vibration better and absorb impacts to a greater degree than slotted retaining pins, since the spiral design may flex after assembly, while the slotted version cannot flex after the slot or gap of pin 50 is squeezed closed.

The newly proposed retainment assembly for wrist pin 40 improves lubrication of wrist pin 40 within piston 24 due to the fact that the wrist pin axial ends faces 41 spaced within wrist pin bore 38. Additionally, frictional losses between the retaining means and wrist pin 38 is reduced since contact between wrist pin end faces 41 and pin members 50 create line contacts instead of a circumferential contact, thereby reducing frictional contact area.

Figure 5:
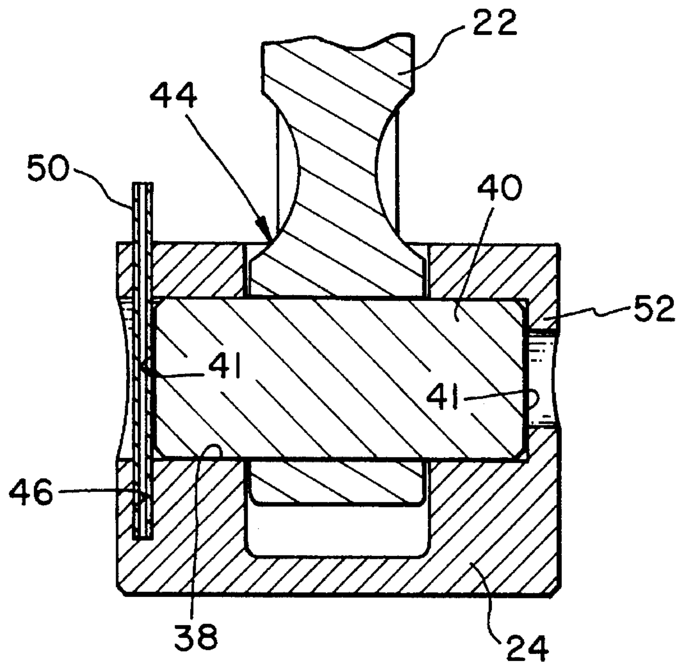
FIG. 5 is a longitudinal sectional view of a piston including an alternate embodiment of the present invention.
Figure 6:
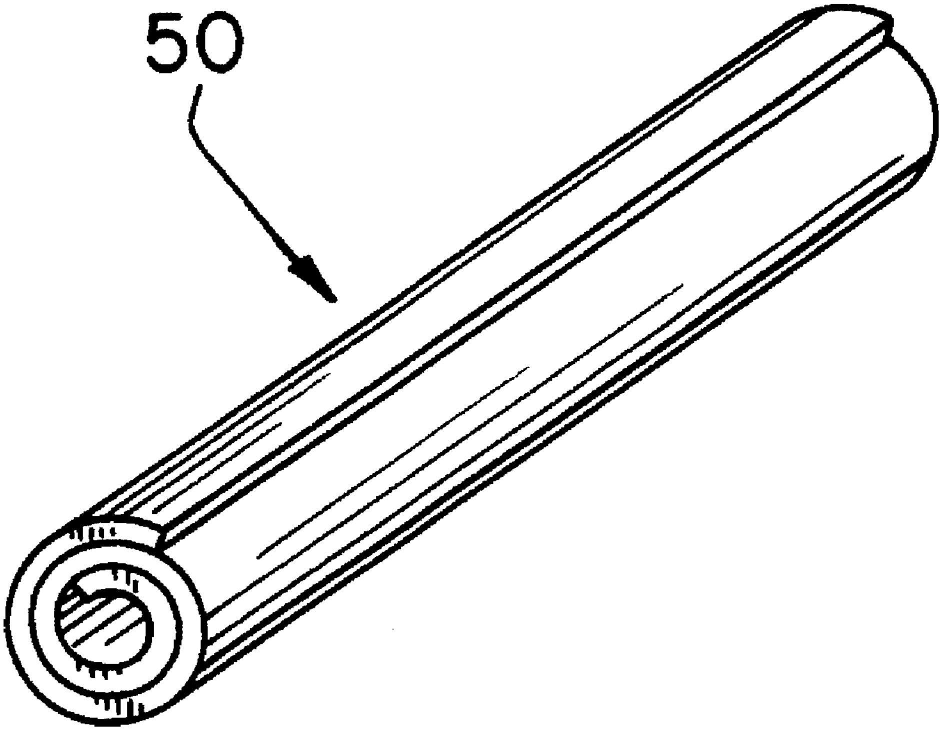
FIG. 6 is a perspective view of an alternative embodiment of the pin member of FIG. 3.

An alternate embodiment of the invention utilizing a single pin member 50 is shown in FIG. 5, in which an extension 52 of piston 24 extends radially into wrist pin bore 38. Extension 52 may comprise ears, tabs or an annular shoulder integral with piston 24 sufficient to prevent wrist pin 40 from sliding past extension 52 and into contact with cylinder bore 26. The combination of pin member 50 and extension 52 permit wrist pin 40 to free float within wrist pin bore 38 without binding.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compressor comprising:

a housing;

a crankcase disposed within said housing, said crankcase having a cylinder bore;

a piston reciprocably disposed within said cylinder bore, said piston having a wrist pin bore extending transversely therethrough, said piston having pin members disposed transversely through said wrist pin bore;

a connecting rod;

a wrist pin connecting said piston to said connecting rod, said wrist pin floatingly disposed within said wrist pin bore between said pin members, whereby said wrist pin is permitted to slide axially with respect to said wrist pin bore but is prevented from sliding against said cylinder bore during piston reciprocation.

2. The compressor of claim 1 in which said pin members are slotted tubular pins.

3. The compressor of claim 1 in which said pin members are formed of spiral wrapped steel.

4. The compressor of claim 1 in which said pin members form a friction reducing line contact with said wrist pin.

5. A compressor comprising:

a housing;

a crankcase disposed within said housing, said crankcase having a cylinder bore;

a piston reciprocably disposed within said cylinder bore, said piston having a wrist pin bore extending transversely therethrough;

a connecting rod with an aperture;

a wrist pin floatingly disposed within said wrist pin bore and said connecting rod aperture; and two pin members disposed transversely through said wrist pin bore, said wrist pin retained between said pin members whereby said wrist pin is permitted to slide axially with respect to said wrist pin bore but is prevented from sliding against said cylinder bore during piston reciprocation.

6. The compressor of claim 5 in which said pin members are slotted tubular pins.

7. The compressor of claim 5 in which said pin members are formed of spiral wrapped steel.

8. The compressor of claim 5 in which said pin members form a friction reducing line contact with said wrist pin.

9. A compressor comprising:

a housing;

a crankcase disposed within said housing, said crankcase having a cylinder bore;

a piston reciprocably disposed within said cylinder bore, said piston having a wrist pin bore extending transversely therethrough;

a wrist pin floatingly disposed within said wrist pin bore; and two pin members disposed through said wrist pin bore, said piston including two bores parallel to the piston axis and through said wrist pin bore, a said pin member disposed in each said bore, said wrist pin retained between said pin members whereby said wrist pin is permitted to slide axially with respect to said wrist pin bore but is prevented from sliding against said cylinder bore during piston reciprocation.

10. The compressor of claim 9 in which said pin members are slotted tubular pins.

11. The compressor of claim 9 in which said pin members are formed of spiral wrapped steel.

12. The compressor of claim 9 in which said pin members form a friction reducing line contact with said wrist pin.

13. A compressor comprising:

a housing;

a crankcase disposed within said housing, said crankcase having a cylinder bore;

a piston reciprocably disposed within said cylinder bore, said piston having a wrist pin bore extending transversely therethrough, said piston having an extension extending radially into said wrist pin bore, said piston having a pin member disposed transversely through said wrist pin bore;

a connecting rod; and a wrist pin connecting said piston to said connecting rod, said wrist pin floatingly disposed within said wrist pin bore between said pin member and said extension, whereby said wrist pin is permitted to slide axially with respect to said wrist pin bore but is prevented from sliding against said cylinder bore during piston reciprocation.

* * * * *